US008553297B2

(12) United States Patent
Taki (10) Patent No.: US 8,553,297 B2
(45) Date of Patent: Oct. 8, 2013

(54) DRIVING APPARATUS (75) Inventor: Hideo Taki, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 126 days.

(21) Appl. No.: 13/312,898

(22) Filed: Dec. 6, 2011

(65) Prior Publication Data

US 2012/0140293 A1 Jun. 7, 2012

(30) Foreign Application Priority Data

Dec. 6, 2010 (JP) ................................. 2010-271603

(51) Int. Cl.
*H04N 1/04* (2006.01)
(52) U.S. Cl.
USPC ........................................................ 358/474
(58) Field of Classification Search
USPC ................. 358/474, 448, 482, 483, 475, 509;
219/662, 660, 619
See application file for complete search history.

(56) References Cited

U.S. PATENT DOCUMENTS

| 5,612,580 | A  | * | 3/1997  | Janonis et al. ................... 307/64 |
| 6,806,448 | B2 | * | 10/2004 | Ohishi et al. .................. 219/662 |
| 6,977,362 | B2 | * | 12/2005 | Ohishi et al. .................. 219/662 |
| 7,358,467 | B2 | * | 4/2008  | Yang et al. ..................... 219/662 |
| 8,098,740 | B2 | * | 1/2012  | Suh et al. .................. 375/240.27 |
| 8,300,142 | B2 | * | 10/2012 | Konno ........................... 348/372 |

FOREIGN PATENT DOCUMENTS

| JP | 08-149894 A   | 6/1996 |
| JP | 09-163798 A   | 6/1997 |
| JP | 2010-268316 A | 9/2001 |

* cited by examiner

*Primary Examiner* — Negussie Worku
(74) *Attorney, Agent, or Firm* — Kilpatrick Townsend & Stockton LLP (57) ABSTRACT To rotate a transport motor and to stop a carriage motor at an ADF reading angle, a control unit outputs a first and a second signal to a first and a second D/A converter, and a power on/off signal to an A-phase driver circuit for the carriage motor. The D/A converters convert the signal to a first and a second voltage. A transport motor driver supplies power to the transport motor on the basis of the first voltage, and a carriage motor driver turns on and off power supply to the A-phase on the basis of the first voltage and the power on/off signal, and supplies power to a B-phase on the basis of the second voltage.

7 Claims, 7 Drawing Sheets

DRIVING APPARATUS

INCORPORATED BY REFERENCE

The entire disclosure of Japanese Patent Application No. 2010-271603, filed Dec. 6, 2010 is expressly incorporated by reference herein.

BACKGROUND

1. Technical Field

The present invention relates to a driving apparatus.

2. Related Art

With reference to an image reading apparatus that includes a scanner unit for reading a source document, a stepping motor that moves the scanner unit, and an ADF including an ADF motor that transports the source document, a technique is known that controls the excitation phase of the stepping motor to utilize the driving force of the stepping motor to fix the scanner unit at an ADF reading position, so as to read the source document transported by the ADF to the ADF reading position through the scanner unit, for example as disclosed in JP-A-2001-268316. According to this document, the scanner unit is prevented from being displaced by the vibration of the ADF motor while reading the source document. In this driving apparatus, the stepping motor is driven by a first motor driver and a second motor driver that supply a current to an A-phase winding and a B-phase winding, respectively, in accordance with a signal from a CPU or a gate array.

In addition, for example JP-A-9-163798 discloses a driving apparatus that includes a two-phase stepping motor, a driver that drives the stepping motor, two D/A converters that convert an input signal and output the converted signal, and a microcomputer that outputs a signal to the D/A converters and the driver. In this driving apparatus, an excitation signal from the microcomputer is inputted to the driver through the respective D/A converters, and the driver drives the two-phase stepping motor with a constant current.

A driving apparatus used for image processing requires the same number of D/A converters that convert a digital signal from the CPU and the microcomputer into an analog signal as the number of motors. For example, in the case where the ADF motor is a single-phase motor and the stepping motor is a two-phase motor, three D/A converters are necessary. However, since the driving apparatus is normally incorporated in an image reading apparatus or the like, it is desirable to simplify the structure of the driving apparatus, to reduce the space occupied by the driving apparatus.

SUMMARY

An advantage of the invention is that a driving apparatus is provided that has a simplified structure despite including a single-phase motor and a two-phase motor.

In an aspect, the invention provides a driving apparatus including a single-phase motor, a two-phase motor, a first signal converter that converts a first input signal into a voltage and outputs the voltage, a second signal converter that converts a second input signal into a voltage and outputs the voltage, a single-phase motor driver that supplies power to the single-phase motor on the basis of a first converted voltage outputted from the first signal converter so as to drive the single-phase motor, and a two-phase motor driver that drives the two-phase motor by supplying power to a first phase on the basis of the first converted voltage and a second power on/off signal indicating whether power is to be supplied to the first phase of the two-phase motor and by supplying power to a second phase of the two-phase motor on the basis of a second converted voltage outputted from the second signal converter, and a signal output unit that outputs, to rotate the single-phase motor and to stop the two-phase motor while supplying power thereto, a first signal that causes the single-phase motor driver to supply power to the single-phase motor, to the first signal converter; the second power on/off signal to the two-phase motor driver so as to cause the two-phase motor driver to supply to the first phase a first phase target current to be supplied thereto for stopping the two-phase motor; and a second signal that causes the two-phase motor driver to supply to the second phase a second phase target current to be supplied thereto for stopping the two-phase motor, to the second signal converter.

In the thus-configured driving apparatus, the signal output unit outputs, to rotate the single-phase motor and to stop the two-phase motor while supplying power thereto, a signal that causes the single-phase motor driver to supply power to the single-phase motor, to the first signal converter, a power on/off signal (indicating whether power is to be supplied to the first phase) to the two-phase motor driver so as to cause the two-phase motor driver to supply to the first phase a first phase target current to be supplied to the first phase; and a signal that causes the two-phase motor driver to supply to the second phase a second phase target current to be supplied to the second phase, to the second signal converter. The single-phase motor driver drives the single-phase motor by supplying power thereto on the basis of the first converted voltage outputted from the first signal converter. The two-phase motor driver drives the two-phase motor by supplying power to a first phase on the basis of the first converted voltage and a second power on/off signal indicating whether power is to be supplied to the first phase of the two-phase motor and by supplying power to a second phase of the two-phase motor on the basis of a second converted voltage outputted from the second signal converter. Driving thus the single-phase motor and the two-phase motor allows the signal converter to work in common with respect to the first phase of the single-phase motor and the two-phase motor, to thereby cause the single-phase motor to rotate and to stop the two-phase motor. This results in reduced number of the signal converters. Consequently, the driving apparatus can be simplified and made smaller in size, which leads to reduced manufacturing cost. Here, the single-phase motor may be a DC motor. The two-phase motor may be a stepping motor.

In the foregoing driving apparatus, the signal output unit may be configured to output the power on/off signal to the two-phase motor driver so as to cause the two-phase motor driver to supply power to the first phase at a duty ratio that makes a mean current supplied to the first phase equivalent to the first phase target current for stopping the two-phase motor, to stop the two-phase motor while supplying power thereto. In this case, the signal output unit may be configured to set a ratio of the second converted voltage with respect to the first converted voltage as the duty ratio, when the two-phase motor is to be stopped by supplying the same current to the first phase and the second phase. Such an arrangement allows the duty ratio to be easily determined.

In addition, the signal output unit may be configured to output the power on/off signal to the two-phase motor driver so as to cause the two-phase motor driver to alternately turn on and off the power supply to the first phase at a cycle shorter than a cycle corresponding to a frequency in an audible range, when the two-phase motor is to be stopped while power is being supplied thereto. Such an arrangement prevents a user from perceiving a sound (noise) originating from the repeated turning on and off of the power supply to the first phase.

In the case where the thus-configured driving apparatus is incorporated in an image reading apparatus that emits light to a source document so as to read an image, the two-phase motor may serve to move a reading unit that emits light to the source document and receives a reflected light to thereby read the source document; the single-phase motor may serve to transport the source document; and the rotation of the single-phase motor and stopping of the two-phase motor while supplying power thereto may be construed as corresponding to transporting of the source document to a reading region and reading of the source document with the reading unit fixed at a position corresponding to the reading region. Such a configuration allows the single-phase motor to be rotated and the two-phase motor to be stopped by utilizing the signal converter in common for the first phase of the single-phase motor and the two-phase motor, to thereby transport the source document to the reading region and to read the source document with the reading unit fixed at the position corresponding to the reading region.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
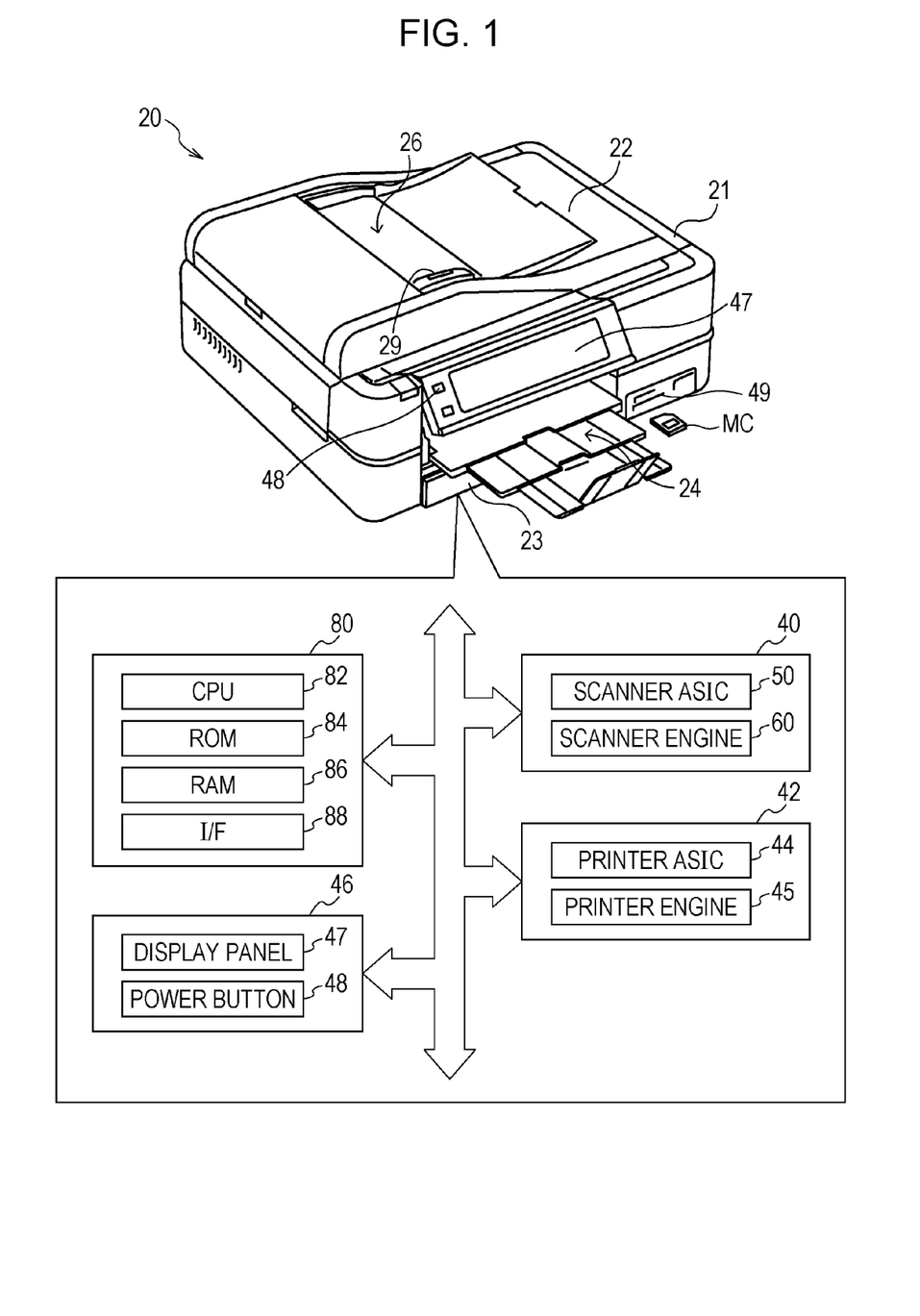
FIG. 1 is a perspective view showing a multifunction printer, with a block diagram showing a configuration thereof.
Figure 2:
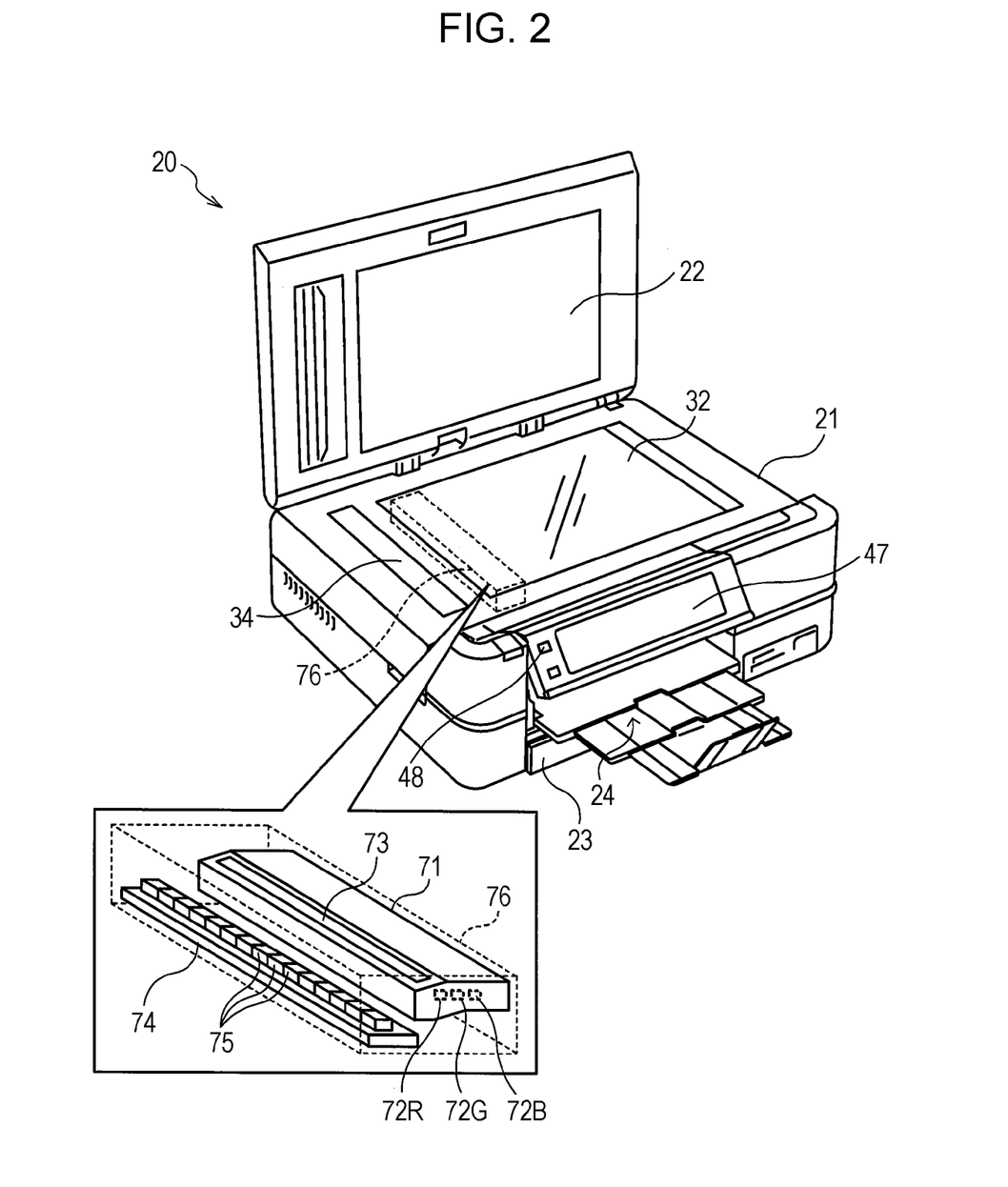
FIG. 2 is a perspective view showing the multifunction printer, with a casing cover opened.
Figure 3:
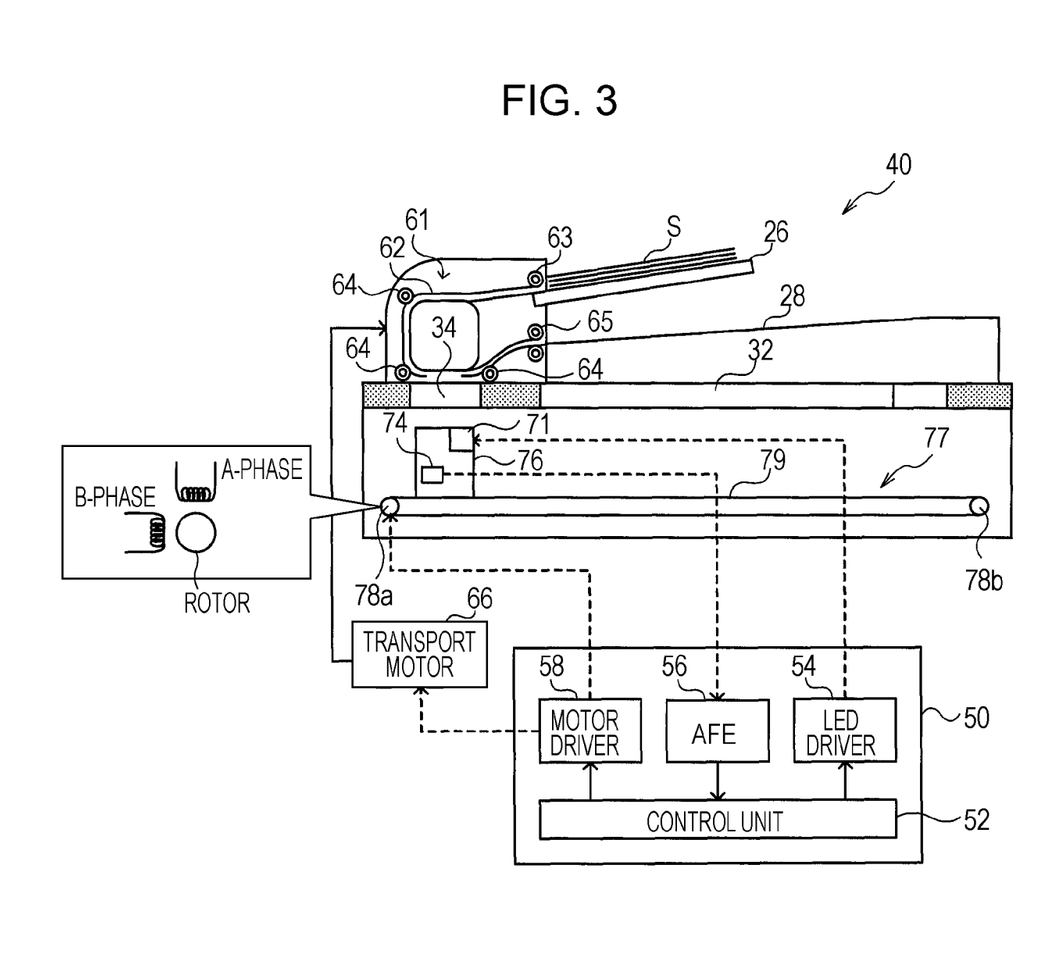
FIG. 3 is a schematic side view showing a configuration of a scanner unit.
Figure 4:
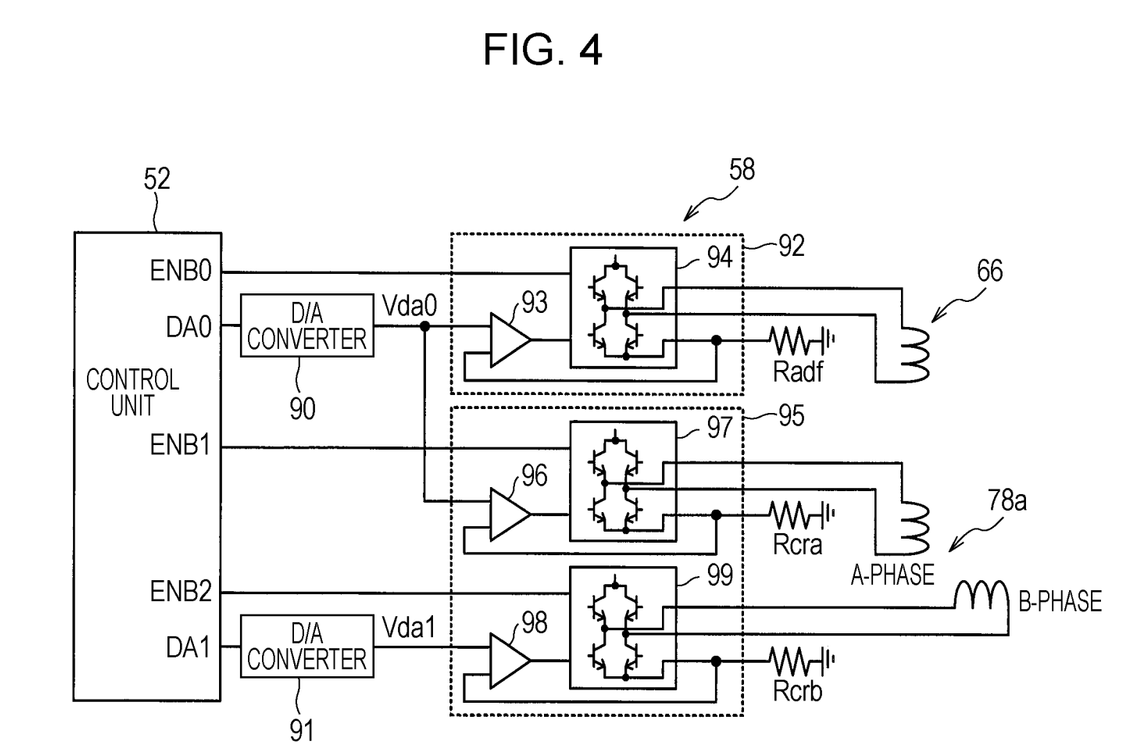
FIG. 4 is a schematic diagram showing a configuration of a motor driver and associated components.

Hereafter, an embodiment of the invention will be described referring to the drawings. FIG. 1 is a perspective view showing a general configuration of a multifunction printer 20 according to the embodiment of the invention. FIG. 2 is a perspective view showing the multifunction printer 20, with a casing cover 22 opened. FIG. 3 is a schematic side view showing a configuration of a scanner unit 40. FIG. 4 is a schematic diagram showing a configuration of a motor driver 58 and associated components.

The multifunction printer 20 according to this embodiment includes a casing 21, a casing cover 22 for opening and closing the upper face of the casing 21, a scanner unit 40 that optically reads a source document to thereby generate image data, a printer unit 42 that feeds paper sheets placed in a cassette 23; prints an image on the paper sheet; and outputs the paper sheet to a paper output tray 24, an operation panel 46 to be operated by a user, and a main controller 80 that controls the entirety of the multifunction printer 20. A glass table 32 is provided on the upper face of the casing 21 (see FIG. 2), so that a source document placed on the glass table 32 can be optically read by the scanner unit 40 (hereinafter, fixed document reading mode). The casing cover 22 includes a built-in automatic document feeder unit (hereinafter, ADF unit) 61 (see FIG. 3), so that the scanner unit 40 can optically read the source documents placed on an ADF inlet 26 along a document guide 29 and automatically successively transported (hereinafter, ADF reading mode).

The scanner unit 40 includes a scanner ASIC 50 and a scanner engine 60. The scanner ASIC 50 is an integrated circuit that controls the scanner engine 60, so as to cause the scanner engine 60 to read the source document as image data either in the fixed document reading mode or ADF reading mode, upon receipt of a scanning instruction from the main controller 80. The acronym ASIC stands for application-specific integrated circuit.

The scanner engine 60 includes, as shown in FIG. 3, an ADF unit 61 that automatically transports the source document placed on the ADF inlet 26 to an ADF reading region 34, a light source unit 71 that emits light to the glass table 32 or the ADF reading region 34, a contact image sensor (CIS) 74 that receives reflected light from the source document and stores the light as a charge to thereby read the source document, a carriage 76 that carries the light source unit 71 and the CIS 74, and a moving mechanism that includes a carriage motor 78a constituted by a stepping motor that drives a belt 79 wound over the carriage motor 78a and a slave roller 78b, so as to cause the carriage 76 to reciprocate in a sub-scanning direction. The ADF unit 61 includes a pickup roller 63 located close to the ADF inlet 26, a plurality of transport rollers 64 provided along a transport route 62, and a paper output roller 65 located close to an ADF paper output tray 28, so that upon rotating the rollers 63, 64, and 65 with a transport motor 66 constituted by a DC motor (single-phase motor) the source documents placed on the ADF inlet 26 are automatically introduced into the transport route 62 one after another. The light source unit 71 includes light sources of three colors, namely, a red LED 72R that emits a red light, a green LED 72G that emits a green light, and a blue LED 72B that emits a blue light (see FIG. 2), and emits the light from the light sources to the glass table 32 or the ADF reading region 34 through a light guide 73. The CIS 74 includes a plurality of photodetectors (CMOS image sensors) 75 corresponding to one line in a main scanning direction, and generates color image data by sequentially switching between the LEDs 72R, 72G, and 72B thereby reading each color component of the reflected light. In this embodiment, the carriage motor 78a is constituted by a two-phase stepping motor including a rotor attached to a rotary shaft and two-phase coils wound on stators (not shown), as shown in an enlarged portion in FIG. 3.

The scanner ASIC 50 includes a control unit 52 that controls the devices, an LED driver 54 that turns on and off the LEDs 72R, 72G, and 72B individually, an analog front end (AFE) 56 that converts the charge (analog signal) outputted from the CIS 74 into a digital signal, and a motor driver 58 that operates a switching element such as a transistor to thereby drive the carriage motor 78a and the transport motor 66. The motor driver 58 includes, as shown in FIG. 4, a D/A converter 90 that converts the digital signal DA0 from the control unit 52 into an analog signal (voltage) Vda0 and outputs the analog signal Vda0, a D/A converter 91 that converts the digital signal DA1 from the control unit 52 into an analog signal (voltage) Vda1 and outputs the analog signal Vda1, a transport motor driver 92 that drives the transport motor 66 by supplying power thereto on the basis of the voltage Vda0 from the D/A converter 90 and a power on/off signal ENB0 outputted from the control unit 52 and indicating whether power is to be supplied to the transport motor 66, and a carriage motor driver 95 that drives the carriage motor 78a by supplying power to an A-phase and a B-phase of the carriage motor 78a on the basis of the voltages Vda0, Vda1 from the D/A converters 90, 91, and power on/off signals ENB1, ENB2 respectively outputted from the control unit 52 and indicating whether power is to be supplied to the A-phase and the B-phase. The transport motor driver 92 includes a comparator 93 that compares the voltage Vda0 from the D/A converter 90 with a voltage Vadf applied to a current detection resistor Radf of the transport motor 66 (voltage corresponding to a current Iadf of the transport motor 66) and outputs the result, and a transport motor driver circuit 94, such as an H-bridge circuit, that operates the switching element in accordance with the output from the comparator 93 and the power on/off signal ENB0 from the control unit 52 to thereby turn on and off the power to the coil of the transport motor 66. The carriage motor driver 95 includes a comparator 96 that compares the voltage Vda0 from the D/A converter 90 with a voltage Vcra applied to a current detection resistor Rcra of the A-phase of the carriage motor 78a (voltage corresponding to a current Icra of the A-phase of the carriage motor 78a) and outputs the result, a carriage motor A-phase driver circuit 97, such as an H-bridge circuit, that operates the switching element in accordance with the output from the comparator 96 and the power on/off signal ENB1 from the control unit 52 to thereby turn on and off the power to the coil of the A-phase of the carriage motor 78a, a comparator 98 that compares the voltage Vda1 from the D/A converter 91 with a voltage Vcrb applied to a current detection resistor Rcrb of the B-phase of the carriage motor 78a (voltage corresponding to a current Icrb of the B-phase of the carriage motor 78a) and outputs the result, and a carriage motor B-phase driver circuit 99, such as an H-bridge circuit, that operates the switching element in accordance with the output from the comparator 98 and the power on/off signal ENB2 from the control unit 52 to thereby turn on and off the power to the coil of the B-phase of the carriage motor 78a. Here, the current detection resistor Radf has an end thereof connected to the transport motor driver circuit 94 and the other end grounded; the current detection resistor Rcra has an end connected to the carriage motor A-phase driver circuit 97 and the other end grounded; the current detection resistor Rcrb has an end connected to the carriage motor B-phase driver circuit 99 and the other end grounded; and the current detection resistor Rcra and the current detection resistor Rcrb have the same resistance in this embodiment. Also, in this embodiment, the power on/off signals ENB0, ENB1, and ENB2 permit power supply in an on state, and inhibit power supply in an off state. In addition, although the driver circuits 94, 97, 99 are exemplified by the H-bridge circuit in FIG. 4, other types of circuits may be employed.

The printer unit 42 includes a printer ASIC 44 and a printer engine 45. The printer ASIC 44 is an integrated circuit that controls the printer engine 45 so as to print an image on recording paper, upon receipt of an instruction from the main controller 80, on the basis of an image file that is the subject of the printing instruction. In this embodiment, the printer engine 45 constitutes a known ink jet color printing mechanism that ejects an ink from a printing head to the recording paper. Accordingly, no further description of the printer unit 42 will be made.

The operation panel 46 includes a display panel 47 located in a central portion thereof and a power button 48 provided on the left side of the display panel 47. The display panel 47 is of a touch-panel type, and displays a mode button for selection of a printing mode, selection/setting buttons to be touched in accordance with a guide displayed on the screen for selection of a menu or an item, and a start button for starting a copying or printing job, the buttons allowing a user's touching operation to be accepted. Examples of the modes that can be selected by the mode button include a copy mode in which a source document placed on the glass table 32 is scanned and copied, a memory card mode in which an image stored in a memory card MC in a memory card slot 49 is printed or a source document is scanned so as to generate image data and store the image data in the memory card MC, and a film mode in which a photographic film is scanned and the film data is printed or stored in the memory card MC.

The main controller 80 is constituted by a micro processor essentially including a CPU 82, and includes a ROM 84 containing various processing programs, data, and tables, a RAM 86 that temporarily stores scan data and printing data, and an internal communication interface 88 that enables communication with the operation panel 46. The main controller 80 has a function of receiving action signals and detection signals from the printer unit 42 and the scanner unit 40, and receiving operation signals generated by the user's touching operation on the operation panel 46. The main controller 80 has also a function of reading out an image file from the memory card MC loaded in the memory card slot 49, outputting an instruction to print the image data to the printer unit 42, outputting an instruction to read out the image data to the scanner unit 40 in accordance with a scanning instruction from the operation panel 46, and outputting an instruction to control the display panel 47 to the operation panel 46.

Essentially, the transport motor 66, the carriage motor 78a, the D/A converters 90 and 91, the transport motor driver 92, the carriage motor driver 95, and the control unit 52 constitute the driving apparatus according to this embodiment.

An operation of the thus-configured multifunction printer 20 according to this embodiment will now be described, focusing on an operation of reading a source document. The fixed document reading mode will be first described, followed by description of the ADF reading mode.

To read a source document in the fixed document reading mode, the source document is placed on the glass table 32 and image data thereof is acquired by emitting light from all the LEDs 72R, 72G, and 72B to the source document while moving the carriage 76 in the sub-scanning direction, and storing the same number of charges (electrical signals) outputted by the photodetector 75 of the CIS 74 as the number of pixels in the main scanning direction, and then the image data is subjected to a correction process such as shading correction, to generate corrected image data. In this case, while the carriage motor 78a has to be rotated in order to move the carriage 76, it is not necessary to rotate (drive) the transport motor 66. Accordingly, a driving operation of the carriage motor 78a will be described here below.

Figure 5:
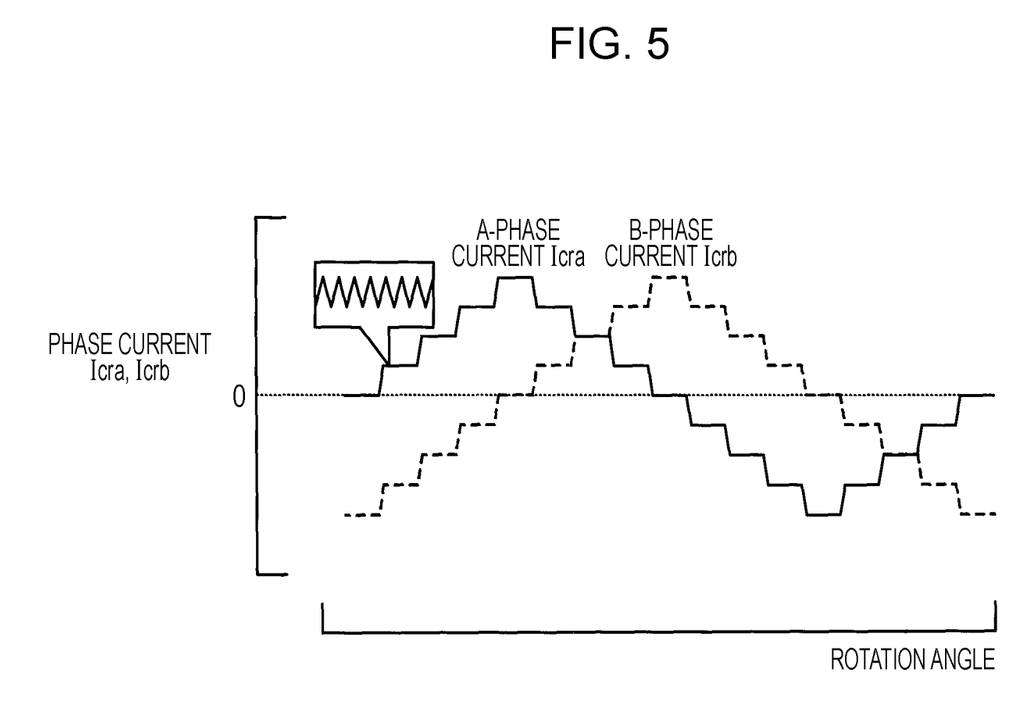
FIG. 5 is a diagram for explaining phase currents of a carriage motor.

The control unit 52 outputs the signals DA0, DA1 based on target currents Icra*, Icrb* for the A-phase and the B-phase corresponding to the rotation angle of the carriage motor 78a to the D/A converters 90, 91, and outputs the power on/off signal ENB0 which is constantly off to the transport motor driver circuit 94 and the power on/off signals ENB1, ENB2 which are constantly on to the carriage motor A-phase driver circuit 97 and the carriage motor B-phase driver circuit 99. The D/A converter 90 converts the signal DA0 from the control unit 52 into the voltage Vda0, and the D/A converter 91 converts the signal DA1 from the control unit 52 into the voltage Vda1. The transport motor driver 92 receives the power on/off signal ENB0 which is constantly off from the control unit 52, and hence does not drive the transport motor 66. In contrast, the carriage motor driver 95 operates the switching element of the carriage motor A-phase driver circuit 97 in accordance with the voltage Vda0 from the D/A converter 90, the voltage Vcra applied to the current detection resistor Rcra, and the power on/off signal ENB1 (constantly on), and operates the switching element of the carriage motor B-phase driver circuit 99 in accordance with the voltage Vda1 from the D/A converter 91, the voltage Vcrb applied to the current detection resistor Rcrb, and the power on/off signal ENB2 (constantly on), to thereby drive the carriage motor 78a. Accordingly, the carriage motor 78a is driven so as to rotate by turning on and off power supply in accordance with the rotation angle (in the case of 1-2 phase excitation). FIG. 5 shows an example of the A-phase current Icra, B-phase current Icrb of the carriage motor 78a to be supplied to the carriage motor 78a in a micro step driving mode based on the 1-2 phase excitation. The carriage motor 78a can thus be driven. In the case where the power on/off signals ENB1, ENB2 are on, so-called chopping is performed in the carriage motor A-phase driver circuit 97 and the carriage motor B-phase driver circuit 99 such that the switching element is periodically turned on and off depending on a magnitude ratio of the voltage Vda0 to the voltage Vcra, as well as that of the voltage Vda1 to the voltage Vcrb, to thereby oscillate the A-phase current Icra and the B-phase current Icrb.

An operation to read a source document in the ADF reading mode will now be described. To read the source document in the ADF reading mode, the source document placed on the ADF inlet 26 is automatically transported to the ADF reading region 34 with the carriage 76 fixed at a position corresponding to the ADF reading region 34 (hereinafter, ADF reading position), and image data of the source document is acquired by emitting light from all the LEDs 72R, 72G, and 72B to the source document and storing the same number of charges (electrical signals) outputted by the photodetector 75 of the CIS 74 as the number of pixels in the main scanning direction, and then the image data is subjected to a correction process such as shading correction, to generate corrected image data. In this case, while the transport motor 66 is made to rotate in order to transport the source document, the carriage motor 78a is stopped at a rotation angle corresponding to the ADF reading position (hereinafter, ADF reading angle), so as to fix the carriage 76 at the ADF reading position. Accordingly, a driving operation of the transport motor 66 and the carriage motor 78a will be described here below.

Figure 6:
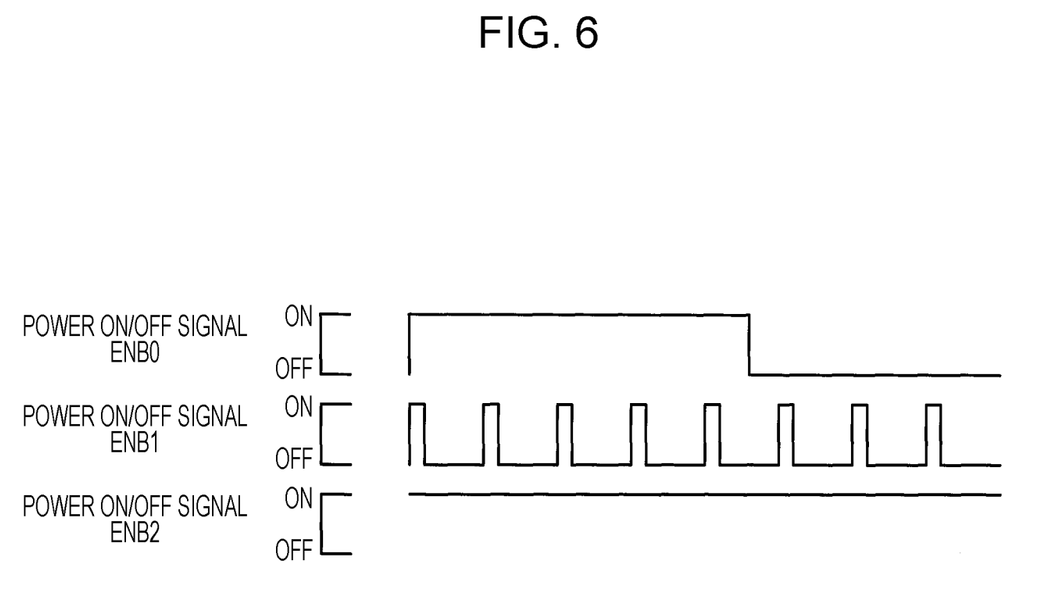
FIG. 6 is a diagram for explaining power on/off signals.

The control unit 52 outputs the signal DA0 based on a target current Iadf* (for instance, hundreds of mA) for rotating the transport motor 66 at a predetermined rotation speed to the D/A converter 90, and outputs the signal DA1 based on a target current Icrb* (for instance, tens of mA) for the B-phase of the carriage motor 78a for stopping the carriage motor 78a at the ADF reading angle to the D/A converter 91. The control unit 52 also outputs the power on/off signal ENB0 to the transport motor driver circuit 94 to adjust the rotation speed of the transport motor 66 in a range lower than a predetermined rotation speed, the power on/off signal ENB1 to the carriage motor A-phase driver circuit 97 to adjust the mean current for the A-phase of the carriage motor 78a; and the power on/off signal ENB2 which is constantly on to the carriage motor B-phase driver circuit 99. The power on/off signal ENB1 outputted in this case serves as a signal that causes the carriage motor A-phase driver circuit 97 to supply power to the A-phase at a duty ratio Duty that makes the mean current for the A-phase of the carriage motor 78a equivalent to the A-phase target current Icra* (for instance, tens of mA) for stopping the carriage motor 78a at the ADF reading angle. FIG. 6 shows an example of the power on/off signals ENB0, ENB1, and ENB2. Then the D/A converter 90 converts the signal DA0 from the control unit 52 into the voltage Vda0, and the D/A converter 91 converts the signal DA1 from the control unit 52 into the voltage Vda1.

The transport motor driver 92 operates the switching element of the transport motor driver circuit 94 on the basis of the voltage Vda0 from the D/A converter 90, the voltage Vadf applied to the current detection resistor Radf, and the power on/off signal ENB0, to thereby drive the transport motor 66. Accordingly, the rotation speed of the transport motor 66 is adjusted by turning on and off power supply in accordance with the power on/off signal ENB0. When the power on/off signal ENB0 is on, what is known as chopping is performed in the transport motor driver circuit 94 such that the switching element is turned on and off depending on a magnitude ratio between the voltage Vda0 and the voltage Vadf.

The carriage motor driver 95 operates the switching element of the carriage motor A-phase driver circuit 97 on the basis of the voltage Vda0 from the D/A converter 90, the voltage Vcra applied to the current detection resistor Rcra, and the power on/off signal ENB0, as well as the switching element of the carriage motor B-phase driver circuit 99 on the basis of the voltage Vda1 from the D/A converter 91, the voltage Vcrb applied to the current detection resistor Rcrb, and the power on/off signal ENB2 (constantly on), to thereby drive the carriage motor 78a. Accordingly, power supply to the A-phase of the carriage motor 78a is turned on and off in accordance with the power on/off signal ENB1, while power is continuously supplied to the B-phase of the carriage motor 78a in accordance with the power on/off signal ENB2 (constantly on). Thus, when power is supplied to the A-phase of the carriage motor 78a a current corresponding to the target current Iadf* is supplied to the A-phase, and the duty ratio Duty of the current is adjusted in accordance with the power on/off signal ENB1 so that the mean current for the A-phase is adjusted, and therefore a current appropriate for stopping the carriage motor 78a at the ADF reading angle can be supplied to the A-phase and the B-phase. Here, the duty ratio Duty is determined on the basis of the ratio of the signal DA0, the voltage Vda0, and the target current Iadf* with respect to the signal DA1, the voltage Vda1, and the target current Icra*, respectively, and in the case where the same current is to be supplied to the A-phase and the B-phase of the carriage motor 78a (target current Icra* and target current Icrb* are equivalent) so as to stop the carriage motor 78a at the ADF reading angle, the ratio of the voltage Vda1 with respect to the voltage Vda0 may be adopted. This is because the A-phase current Icra of the carriage motor 78a is substantially equivalent to a value obtained by dividing the voltage Vda0 from the D/A converter 90 by the current detection resistor Rcra and then multiplying by the duty ratio Duty; the B-phase current Icrb of the carriage motor 78a is substantially equivalent to a value obtained by dividing the voltage Vda1 from the D/A converter 91 by the current detection resistor Rcrb; and the current detection resistor Rcra and the current detection resistor Rcrb have the same resistance, and therefore the value obtained by dividing the voltage Vda1 by the voltage Vda0 may be adopted as the duty ratio Duty in order to make the mean value of the A-phase current Icra of the carriage motor 78a equivalent to the B-phase current Icrb. In addition, since power is continuously supplied to the B-phase of the carriage motor 78a while the source documents are read in the ADF reading mode, it is preferable to set the target current Icrb* for the B-phase of the carriage motor 78a to be smaller than a peak current for rotating the carriage motor 78a from the viewpoint of preventing overheating of the carriage motor 78a, and to set the target current Icra* for the A-phase in accordance with the target current Icrb*.

Figure 7:
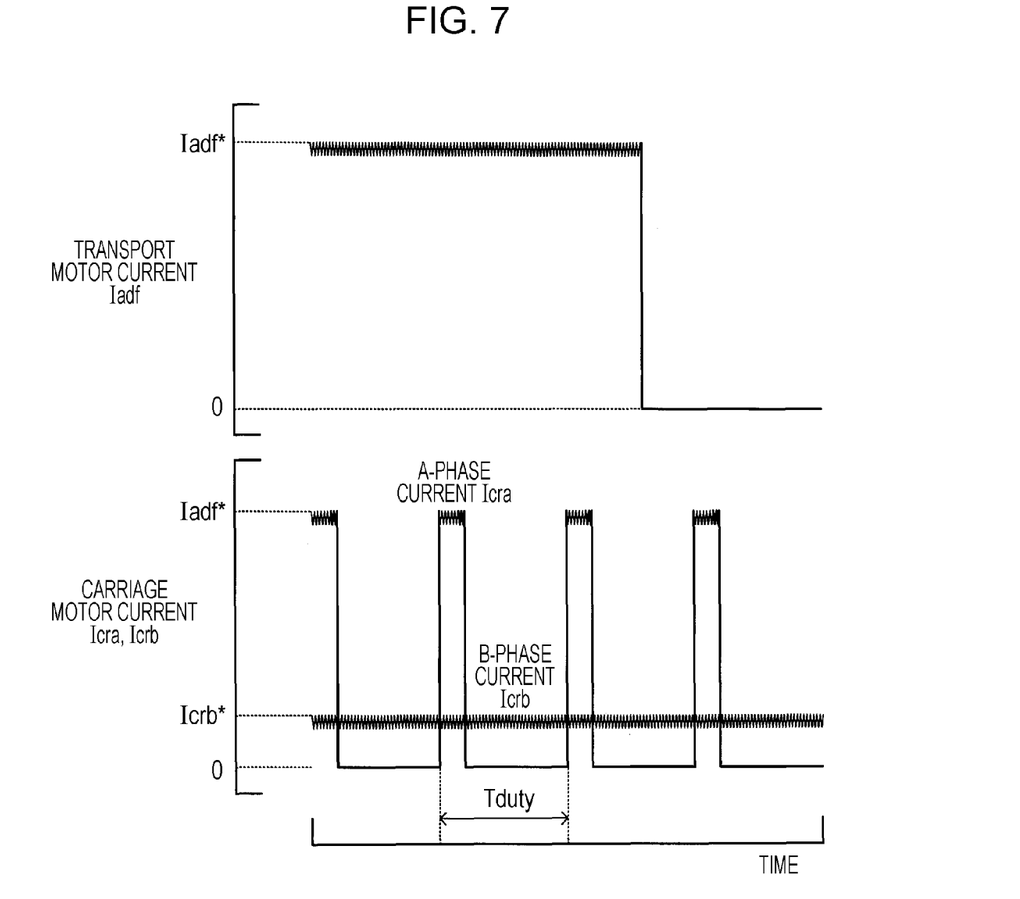
FIG. 7 includes diagrams for explaining a current of a transport motor and the carriage motor.

FIG. 7 includes diagrams showing an example of the A-phase current and the B-phase current supplied as above to the transport motor 66 and the carriage motor 78a. Driving thus the transport motor 66 and the carriage motor 78a allows the D/A converter to be utilized in common for the A-phase of the transport motor 66 and the carriage motor 78a so as to rotate the transport motor 66 and to stop the carriage motor 78a at the ADF reading angle. This results in reduced number of the D/A converters. Consequently, the driving apparatus can be simplified and made smaller in size, which leads to reduced manufacturing cost. In FIG. 7, Tduty represents the on/off cycle of power supply to the A-phase of the carriage motor 78a (cycle of duty control on the basis of duty ratio Duty), and in this embodiment the control unit 52 outputs the power on/off signal ENB1 to the carriage motor A-phase driver circuit 97 such that the cycle Tduty becomes shorter than a cycle corresponding to a frequency in an audible range (approximately 20 Hz to 20000 Hz). Such an arrangement prevents the user from perceiving a sound (noise) originating from the repeated switching actions of the carriage motor A-phase driver circuit 97.

The oscillation of the current Iadf of the transport motor 66 and the A-phase and B-phase currents Icra, Icrb of the carriage motor 78a shown in FIG. 7 is generated by the chopping. In addition, although the direction of a magnetic field generated by the A-phase current and the B-phase current (including the value 0) is changed with the turning on and off of power supply to the A-phase, in this embodiment power supply to the A-phase is turned on and off at a cycle shorter than a period that activates the rotor of the carriage motor 78a to rotate, to thereby hold the carriage motor 78a immobile.

The correspondence between the components employed in this embodiment and the constituents of the invention is as follows. The transport motor 66 according to this embodiment corresponds to the single-phase motor; the carriage motor 78a corresponds to the two-phase motor; the D/A converter 90 corresponds to the first signal converter; the D/A converter 91 corresponds to the second signal converter; the transport motor driver 92 corresponds to the single-phase motor driver; the carriage motor driver 95 corresponds to the two-phase motor driver; and the control unit 52 corresponds to the signal output unit.

Accordingly, in the driving apparatus incorporated in the multifunction printer 20 according to this embodiment, the control unit 52 outputs, to rotate the transport motor 66 so as to read a source document in the ADF reading mode and to stop the carriage motor 78a at the ADF reading angle, the signal DA0 that causes the transport motor 66 to rotate and the signal DA1 based on the target current Icrb* for the B-phase of the carriage motor 78a for stopping the carriage motor 78a at the ADF reading angle, to the D/A converters 90, 91, respectively, and the power on/off signal ENB1 to the carriage motor A-phase driver circuit 97 so as to make the mean current for the A-phase of the carriage motor 78a equivalent to the target current Icra* for the A-phase for stopping the carriage motor 78a at the ADF reading angle. The transport motor driver 92 operates the switching element of the transport motor driver circuit 94 on the basis of the voltage Vda0 converted by the D/A converter 90 from the signal DA0, so as to drive the transport motor 66. The carriage motor driver 95 operates the switching element of the carriage motor A-phase driver circuit 97 on the basis of the voltage Vda0 converted by the D/A converter 90 from the signal DA0 and the power on/off signal ENB1, as well as the switching element of the carriage motor B-phase driver circuit 99 on the basis of the voltage Vda1 converted by the D/A converter 91 from the signal DA1, to thereby drive the carriage motor 78a. Driving thus the transport motor 66 and the carriage motor 78a allows the D/A converter to be utilized in common for the A-phase of the transport motor 66 and the carriage motor 78a so as to rotate the transport motor 66 and to stop the carriage motor 78a at the ADF reading angle. This results in reduced number of the D/A converters. Consequently, the driving apparatus can be simplified and made smaller in size, which leads to reduced manufacturing cost.

It is a matter of course that the invention is in no way limited to the foregoing embodiment, and various modifications may be made within the scope of the invention.

Although the power on/off signal ENB1 is outputted such that the cycle of the duty control, i.e., the repetition of on and off of power supply to the A-phase of the carriage motor 78a, becomes shorter than a cycle corresponding to a frequency in an audible range in the embodiment, the duty control cycle may be set so as to correspond to a frequency in the audible range.

Although in the foregoing embodiment the power on/off signal ENB0 is employed to adjust the rotation speed of the transport motor 66, when the transport motor 66 is rotated and the carriage motor 78a is stopped at the ADF reading angle, the signal DA0 may be employed to adjust the rotation speed of the transport motor 66. In this case, the control unit 52 may output the power on/off signal ENB0 which is constantly on to the transport motor driver circuit 94, or the power on/off signal ENB0 may be left unused. In this case, however, the control unit 52 has to output the power on/off signal ENB1 in accordance with the signal DA0 to the carriage motor A-phase driver circuit 97.

Although the control unit 52 outputs the power on/off signal ENB2 (constantly on) to the carriage motor B-phase driver circuit 99 in order to stop the carriage motor 78a at the ADF reading angle in the embodiment, it is not mandatory to employ the power on/off signal ENB2.

Although the foregoing embodiment refers to the case where equivalent currents are supplied to the A-phase and the B-phase of the carriage motor 78a (target current Icra* and target current Icrb* are equivalent) to stop the carriage motor 78a at the ADF reading angle, the control unit 52 may output, in the case where the A-phase current and the B-phase current of the carriage motor 78a are not equivalent when the carriage motor 78a is to be stopped at the ADF reading angle, the power on/off signal ENB1 to the carriage motor A-phase driver circuit 97 such that the A-phase current becomes equivalent to the target current Icra* (≠Icrb*) for the A-phase for stopping the carriage motor 78a at the ADF reading angle. Here, the target current Icra* for the A-phase may be determined on the basis of the relation with the target current Icrb* for the B-phase, i.e., the direction of the magnetic field generated by the A-phase current and the B-phase current (including the value 0).

Although the light source unit 71 according to the embodiment includes three LEDs 72R, 72G, and 72B, a white LED or a fluorescent lamp may be employed as the light source unit, and the light may be led to a sensor through a mirror or a lens. In addition, the photodetector may be constituted by a charge-coupled device (CCD) image sensor, instead of the CIS 74.

Although the foregoing embodiment refers to a driving apparatus to be incorporated in the multifunction printer 20, the driving apparatus is broadly applicable to image processing apparatuses such as a scanner without a printing function, a facsimile machine, and so forth.

What is claimed is:
1. A driving apparatus comprising:
a single-phase motor;
a two-phase motor;
a first signal converter that converts a first input signal into a voltage and outputs the voltage;
a second signal converter that converts a second input signal into a voltage and outputs the voltage;

a single-phase motor driver that supplies power to the single-phase motor on the basis of a first converted voltage outputted from the first signal converter so as to drive the single-phase motor;

a two-phase motor driver that drives the two-phase motor by supplying power to a first phase on the basis of the first converted voltage and a second power on/off signal indicating whether power is to be supplied to the first phase of the two-phase motor and by supplying power to a second phase of the two-phase motor on the basis of a second converted voltage outputted from the second signal converter; and a signal output unit that outputs, to rotate the single-phase motor and to stop the two-phase motor while supplying power thereto, a first signal that causes the single-phase motor driver to supply power to the single-phase motor, to the first signal converter; the second power on/off signal to the two-phase motor driver so as to cause the two-phase motor driver to supply to the first phase a first phase target current to be supplied thereto for stopping the two-phase motor; and a second signal that causes the two-phase motor driver to supply to the second phase a second phase target current to be supplied thereto for stopping the two-phase motor, to the second signal converter.

2. The driving apparatus according to claim 1, wherein the single-phase motor driver drives the single-phase motor by supplying power thereto on the basis of the first converted voltage and the first power on/off signal indicating whether power is to be supplied to the single-phase motor; and the signal output unit outputs, to stop the single-phase motor and to rotate the two-phase motor, a first signal that causes the two-phase motor driver to supply to the first phase the first phase target current to be supplied thereto, to the first signal converter; the first power on/off signal to the single-phase motor driver so as to stop the single-phase motor; the second power on/off signal to the two-phase motor driver so as to cause the two-phase motor driver to supply to the first phase the first phase target current to be supplied thereto for rotating the two-phase motor; and a second signal that causes the two-phase motor driver to supply to the second phase the second phase target current to be supplied thereto for rotating the two-phase motor, to the second signal converter.

3. The driving apparatus according to claim 1, wherein the signal output unit outputs, to stop the two-phase motor while supplying power thereto, the power on/off signal to the two-phase motor driver so as to cause the two-phase motor driver to supply power to the first phase at a duty ratio that makes a mean current supplied to the first phase equivalent to the first phase target current for stopping the two-phase motor.

4. The driving apparatus according to claim 3, wherein the signal output unit sets a ratio of the second converted voltage to the first converted voltage as the duty ratio, when the two-phase motor is to be stopped by supplying the same current to the first phase and the second phase.

5. The driving apparatus according to claim 1, wherein the signal output unit outputs the power on/off signal to the two-phase motor driver so as to cause the two-phase motor driver to alternately turn on and off power supply to the first phase at a cycle shorter than a cycle corresponding to a frequency in an audible range, when the two-phase motor is to be stopped while power is being supplied thereto.

6. The driving apparatus according to claim 1 to be incorporated in an image reading apparatus that emits light to a source document so as to read an image, wherein the two-phase motor serves to move a reading unit that emits light to the source document and receives reflected light to thereby read the source document;

the single-phase motor serves to transport the source document; and the rotation of the single-phase motor and stopping of the two-phase motor while supplying power thereto correspond to transporting of the source document to a reading region and reading of the source document with the reading unit fixed at a position corresponding to the reading region.

7. A driving apparatus comprising:

a single-phase motor;

a two-phase motor;

a first signal converter that converts a first input signal into a voltage and outputs the voltage;

a second signal converter that converts a second input signal into a voltage and outputs the voltage;

a single-phase motor driver that supplies power to the single-phase motor on the basis of a first converted voltage outputted from the first signal converter so as to drive the single-phase motor;

a first phase driver that drives the second phase of the two-phase motor by supplying power to the second phase of the two-phase motor on the basis of a second converted voltage from the second signal converter; and a second phase driver that drives the first phase of the two-phase motor by supplying power to the first phase of the two-phase motor on the basis of a first converted voltage from the first signal converter, wherein a current supplied from the first phase driver to the first phase is controlled by a power on/off signal indicating whether power is to be supplied to the first phase, and the two-phase motor is stopped by the current supplied from the first phase driver to the first phase and a current supplied from the second phase driver to the second phase.

* * * * *